UNITED STATES PATENT OFFICE.

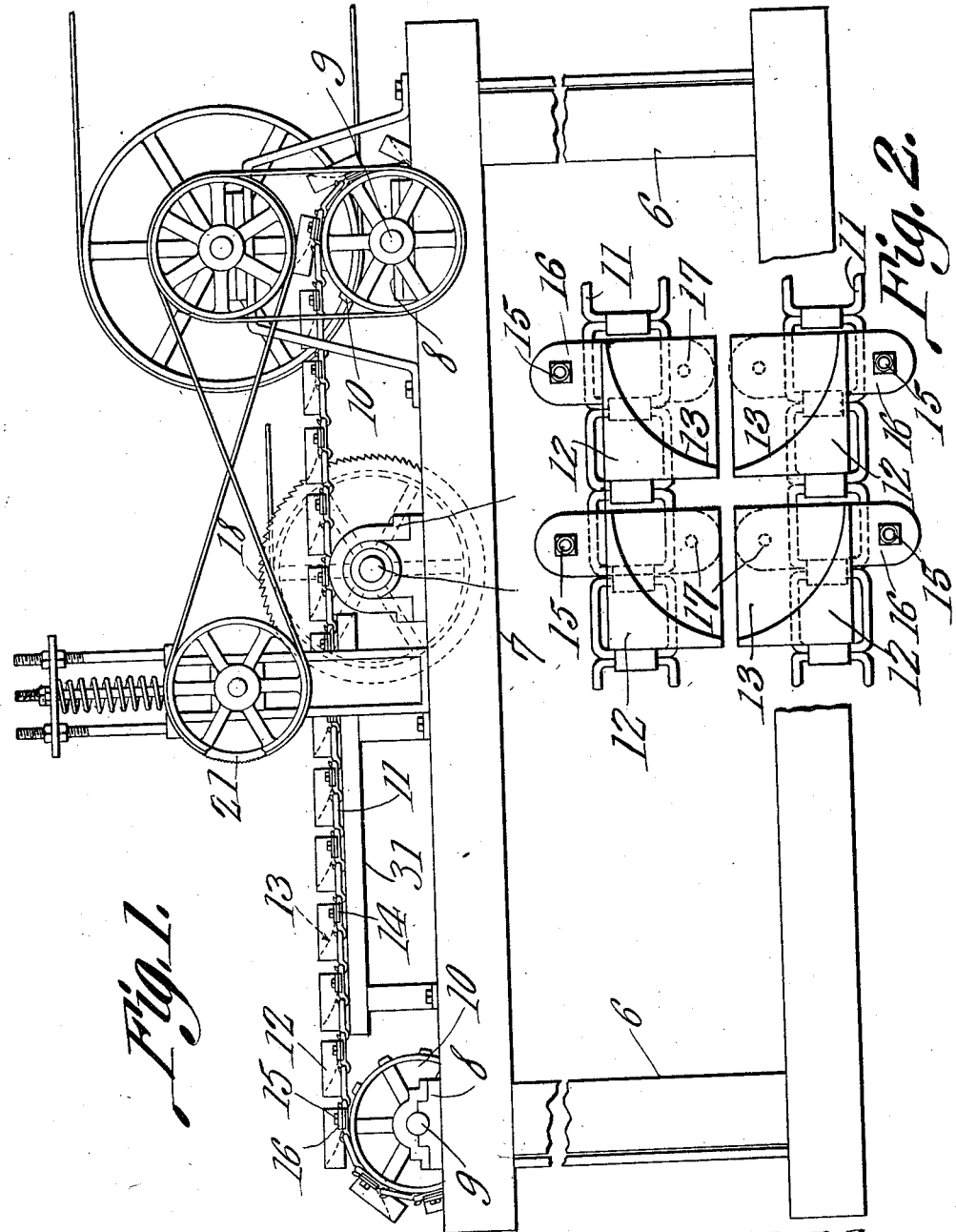

CHARLES U. DAHLGREN, OF GLOSTER, MISSISSIPPI.

CONVEYER.

1,008,791. Specification of Letters Patent. Patented Nov. 14, 1911.

Application filed August 10, 1910. Serial No. 576,466.

*To all whom it may concern:*

Be it known that I, CHARLES U. DAHLGREN, a citizen of the United States, residing at Gloster, in the county of Amite and State of Mississippi, have invented a new and useful Conveyer, of which the following is a specification.

The present invention is a conveyer adapted more particularly for use in decorticating what is known as the Attalea nut, sometimes otherwise called by various names. The machine bisects these and other nuts by means of a circular saw forming no part of the present invention, but in order to feed nuts of this character to an upright saw blade a conveyer of specific construction is necessary so that its parts or members shall pass to both sides of the saw and its bucket shall be of such shape as to successfully hold the nut while the latter is being sawed. These objects are accomplished by a conveyer constructed as hereinafter more fully described and claimed, and as shown in the drawings wherein—

Figure 1 is a side elevation of so much of the machine as is necessary to show the general operation thereof and the location of the saw with respect to the conveyer which forms the subject matter of the present invention, and Fig. 2 is a plan view on an enlarged scale of a portion of the conveyer itself.

In the drawings, the numeral 5 designates the longitudinal sills from which rise standards 6 suporting beams 7 which are suitably connected by means not shown. These beams carry bearings 8 in which are journaled transverse shafts 9 on which are mounted sprocket wheels 10, a pair of said wheels being disposed upon each shaft in a manner which will be clear. Around said sprocket wheels extend endless chains 11 which carry the cups, buckets or receptacles for receiving the nuts to be bisected, and as the two chains are driven simultaneously they together form an endless conveyer. The cups are formed by blocks 12 which are recessed by being cut away at their forward inner corners as indicated at 13. The blocks of one chain are located opposite the blocks of the other chain, and spaced slightly apart as shown in Fig. 2 so that the saw, to be presently described, may pass therebetween. The recesses of the blocks of one chain are located opposite the recesses of the blocks of the other chain, and the two recesses form a pocket which receives a nut. The nut thus extends across the space between the blocks, and upon being carried against the saw it is cut in half. Every other link of the chain 11 is formed with outstanding ears 14 at both its outer and its inner sides. The ear on the outside of the link is connected by a bolt or other suitable fastening means 15 to an ear 16 extending from the corresponding side of the block over the ear 14. The ear extending from the inner side of the link is connected to the block by means of a screw 17 passing through said ear into the bottom of the block. This affords two quite widely separated points of attachment between the link and its block and resists the tendency of the latter to turn on the former when strain is brought to bear upon the block in the running of the machine. Moreover the outer ear 16 on the block projects from the latter where it is thicker, whereas no ear is caused to project from its inner edge where it is thinner by reason of the presence there of the recess 13.

The circular saw for cutting the nuts is indicated at 18, it being located intermediate the sprocket wheels 10, between the blocks 12 of the respective chains 11, as already described, so that when the nuts are carried by the conveyer against the saw, they will be cut in half. The bisected nuts are carried by the conveyer to the rear end of the machine, where they may be dropped into a suitable receptacle (not shown).

At 31 is indicated a table across which the conveyer travels, said table being located between the front sprocket wheel 11 and the saw 18. The rear end of the table has a slot in which the saw works. The pressure disks 21 serve to hold the nuts in the pockets of the conveyer. The conveyer and the saw are driven by suitable connections leading to a source of power.

It is thought that the operation of the machine will be apparent from the foregoing description, but it may be summarized as follows: The nuts are placed in the pockets of the conveyer, and are carried by the same across the table 31 and when they reach the saw they are bisected, they being held fast in the pockets during the cutting action of the saw by the disks. The severed nuts are carried by the conveyer to the rear end of the machine, where the same may be discharged into a suitable receptacle (not shown).

What is claimed is:

In a machine of the character described, an endless conveyer comprising two independent sections each consisting of a chain whereof every other link has outstanding ears at its outer and inner sides, and a series of blocks disposed upon the chains in pairs opposite each other and having their forward inner corners recessed, each block lying over two links and having an outstanding ear at its outer side disposed above and fastened to the outer ear of the link, and a screw passing upward through the inner ear of the link into the bottom of the block.

In testimony that I claim the foregoing as my own, I have hereto affixed my signature in the presence of two witnesses.

CHARLES U. DAHLGREN.

Witnesses:
G. H. BARNEY,
C. H. GOLLOPER.